C. A. MORRIS.
GRIPPING MECHANISM.
APPLICATION FILED APR. 29, 1909.
975,710.
Patented Nov. 15, 1910.
4 SHEETS—SHEET 1.
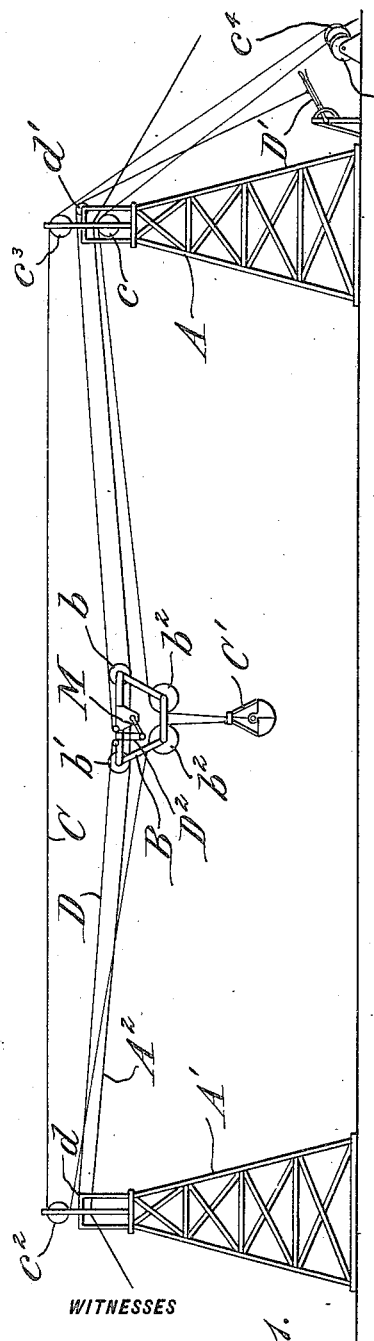
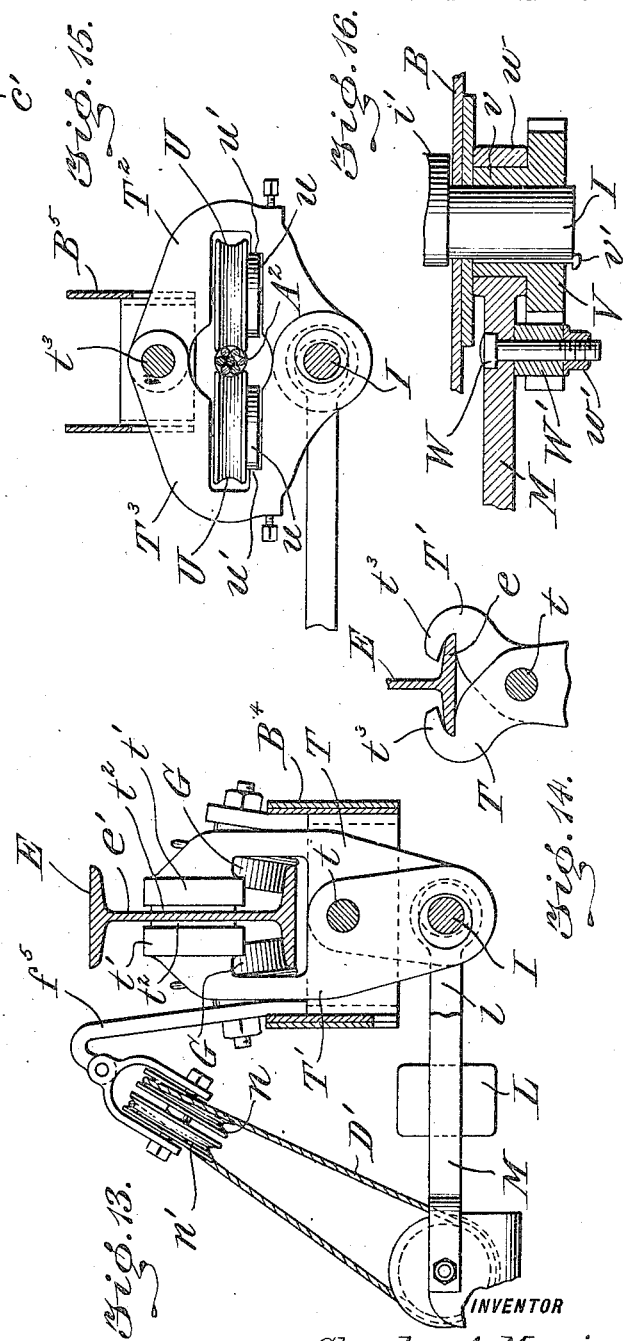
WITNESSES
INVENTOR
Charles A. Morris
BY
ATTORNEYS

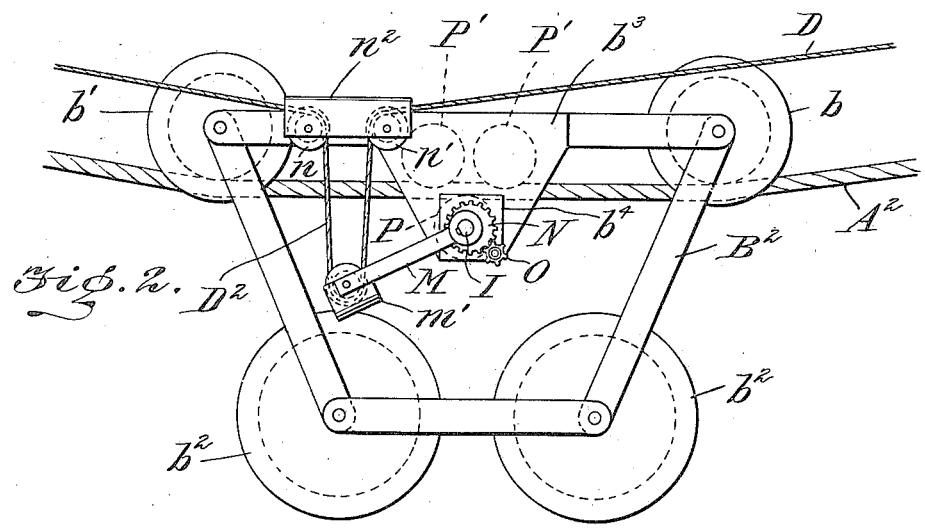
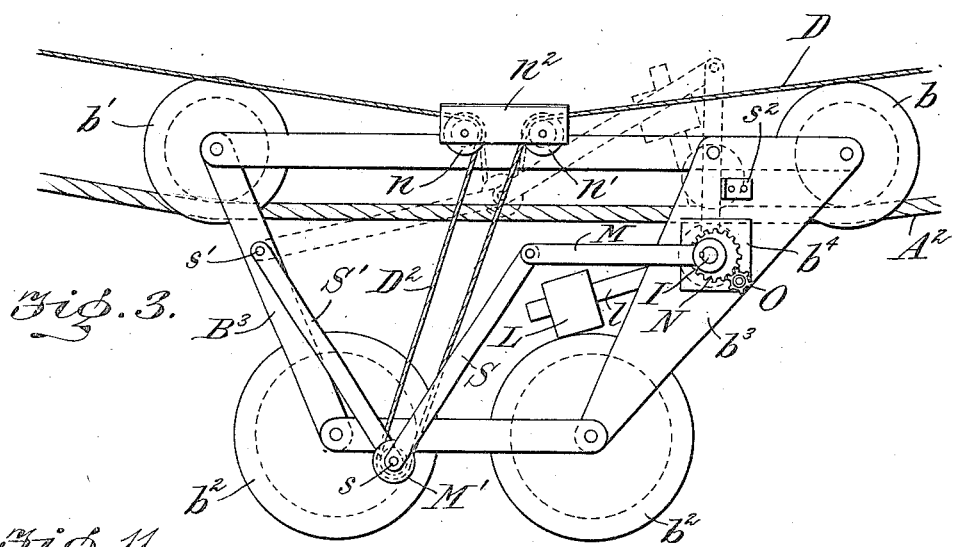
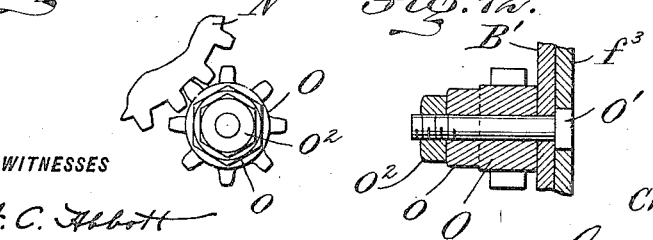

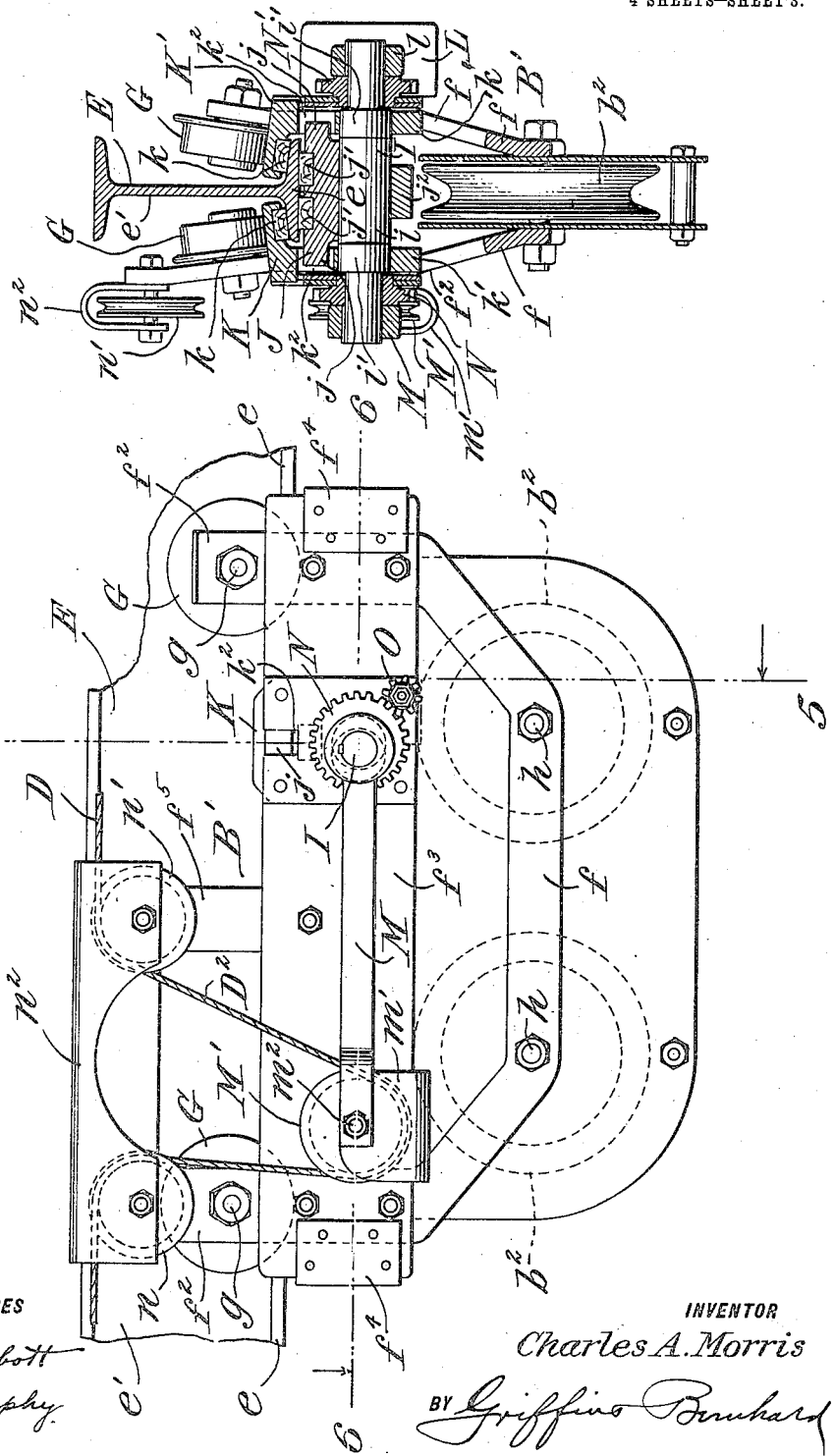

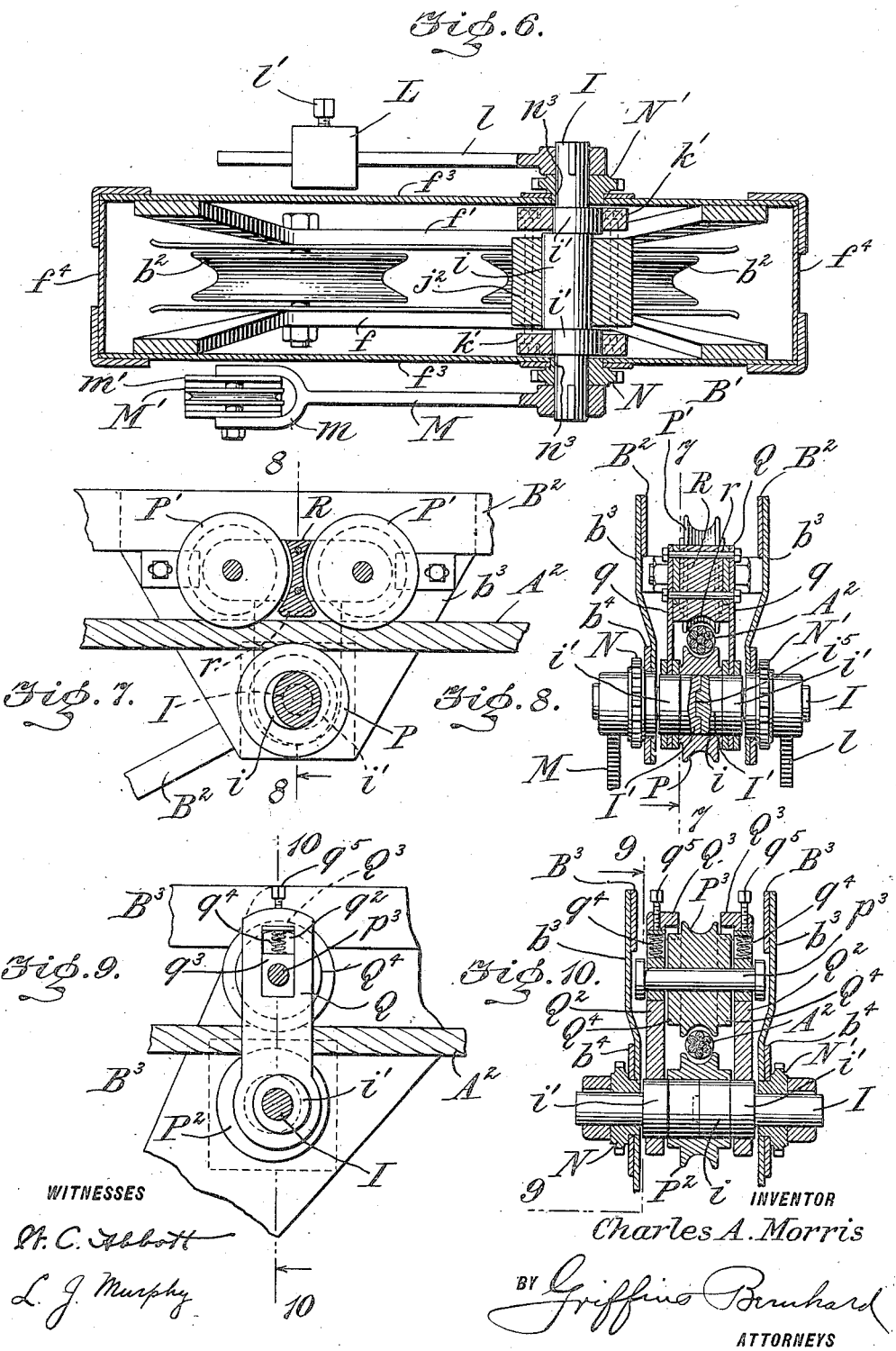

UNITED STATES PATENT OFFICE.

CHARLES A. MORRIS, OF MONTCLAIR, NEW JERSEY.

GRIPPING MECHANISM.

975,710.

Specification of Letters Patent. Patented Nov. 15, 1910.

Application filed April 29, 1909. Serial No. 492,882.

*To all whom it may concern:*

Be it known that I, CHARLES A. MORRIS, a citizen of the United States, residing in Montclair, county of Essex, and State of New Jersey, have invented a certain new and useful Gripping Mechanism, of which the following is a specification.

This invention is a gripping mechanism, the same being especially adapted for use in connection with an aerial track, such as the tracks used in apparatus for hoisting, conveying, loading and unloading materials of all sorts, but it is not desired to confine the invention to systems of the character specified, for the reason that my gripping mechanism may be employed in any apparatus embodying a movable carriage adapted to travel on a relatively stationary track.

Among the novel features of my invention are the following: First, means for positively operating in opposite directions and simultaneously the shoes which engage with the respective faces of a track, whereby great power may be brought upon the shoes for securing the required gripping engagement of said shoes with the track; second, means for bringing the carriage to a full stop and locking it rigidly in position relative to the track by permitting the carriage, when its motion is first checked, to have a limited sliding travel on the track, and then bringing it to the full stop by the action of brake devices which are brought automatically into service subsequently to the initial checking of the carriage; third, means for adjusting the gripping shoes relative to the carriage and the track in order to compensate for wear due to the frictional engagement of said shoes with the track; and, fourth, means for regulating the "throw" of the lever which actuates the shoes of the gripping mechanism.

The invention may be embodied in various constructional forms adapted for use in conjunction with an elevated track, and said track may be either a stretched cable, such as is used in long span cableways, or as a channeled beam, the latter being employed for loading and unloading work. Furthermore, the shoes of the gripping mechanism, in certain forms of the invention, may be positioned for coöperation with the top and bottom faces on the foot flange of a channeled beam, or with the respective side edges on the foot flange of such a beam, or with the respective faces of the web forming an integral part of the beam.

In the accompanying drawings I have illustrated different practical embodiments of the invention, but the constructions shown therein are to be understood as illustrative, only, and not as defining the limits of the invention.

Figure 1 illustrates my invention in connection with a cableway. Fig. 2 is an enlarged view in side elevation illustrating the invention adapted for a cableway of the type shown in Fig. 1. Fig. 3 is a side elevation of a modified form of the invention adapted for the cableway of Fig. 1. Fig. 4 is a side elevation of the invention especially designed for use in conjunction with a channeled beam adapted to serve as a track for the traveling carriage. Fig. 5 is a vertical section, partly in elevation, the plane of the section being indicated by the dotted line 5—5 of Fig. 4. Fig. 6 is a horizontal section, certain of the parts being in plan, the plane of the section being indicated by the dotted line 6—6 of Fig. 4. Fig. 7 is an elevation, partly in section, on the line 7—7 of Fig. 8, illustrating a preferred construction of a carriage for the cableway. Fig. 8 is a cross section on line 8—8 of Fig. 7, certain of the parts being shown in elevation. Fig. 9 is a section on line 9—9 of Fig. 10, certain parts being in elevation illustrating another embodiment of the invention adapted for a cableway. Fig. 10 is a vertical cross section, partly in elevation, on line 10—10 of Fig. 9. Fig. 11 is a fragmentary detail view illustrating an adjusting and locking means for the cam shaft in the constructions shown in Figs. 2 and 3. Fig. 12 is a detail cross section through the locking and adjusting means of Fig. 11. Fig. 13 illustrates another embodiment of the invention wherein the shoes of the gripping mechanism are adapted for engagement with the respective faces on the web of a channeled beam. Fig. 14 is a detail view illustrating an arrangement wherein the shoes are adapted for engagement with the respective edges of a foot flange of a channeled beam. Fig. 15 is a vertical cross section through an embodiment of the invention adapted for a cableway of the types shown in Figs. 1, 2, 3, 7 and 8, wherein a supplementary braking action on the shoes is adapted to be secured by the gripping mechanism. Fig. 16 is a detail sectional view of the adjusting and locking mechanism for the lever employed in the construction of Fig. 4.

As is well known to those skilled in the art, the cableway used for handling material in excavating embodies, generally speaking, towers, A, A', a track cable, A², supported in said towers, a carriage, B, adapted to travel on said track cable, a cable, C, for operating said carriage, and a bucket, skip or sling, C', which is ordinarily suspended from the carriage, and is controlled by cable, C. Carriage, B, is provided with rollers or shoes, $b, b'$, which run on track cable, A², and aid carriage is equipped with sheaves, $b^2$, over which runs the operating cable, C, one length of said cable extending upwardly from the bucket, skip or sling, over one pulley, $b^2$, thence over a pulley, c, mounted in tower, A, and thence running downwardly to a drum, $c'$, whereas the other length of the cable runs upwardly from the bucket, skip or sling over the other sheave, $b^2$, thence to the left in Fig. 1 over and around a pulley, $c^2$, in tower, A', thence to the right over pulley, $c^3$, in tower, A, and thence down to a drum, $c^4$. As will presently appear, carriage, B, is provided with a gripping mechanism which is operated by a line or cable, D, one end of which is anchored, as d, to one of the towers, as A', from which point of anchorage the cable extends to the gripping mechanism to be operated in carriage, B, and thence runs over a pulley, $d'$, mounted in tower, A, from whence the operating line runs to a lever, D', having means for locking the same in position, as shown in Fig. 1. This general construction of the cableway is the same as disclosed in a prior application filed by me on the 3d day of March, 1909, Serial No. 481,065, for an invention appertaining to "Hoisting and conveying mechanism."

I will first describe my invention as embodied in a carriage adapted to travel on a track formed by a channeled beam, E, as illustrated in Figs. 4, 5 and 6 of the drawings. In this connection it is desired to state that the gripping mechanism of the carriage in said form of construction is adapted for engagement with the upper and lower faces of the foot flange, e, forming a part of said channeled beam, E, but it is not desired to limit the invention to an organization of parts wherein the shoes engage with said faces of the foot flange, for the reason that the gripping mechanism may engage with the respective side edges of the foot flange, as shown in Fig. 14, or said gripping mechanism may be so arranged that its shoes will engage with the respective faces of the web, $e'$, forming a part of said channeled beam, as illustrated in Fig. 13.

Carriage, B', in the construction of Figs. 4 to 6 inclusive, consists of side members, $f, f'$, having upstanding arms, $f^2$, side plates, $f^3$, and end members, $f^4$, said side plates and end members being united to the side members, $f, f'$. The upstanding arms, $f^2$, of the carriage frame extend above bottom flange, e, of the channeled beam, and in these arms are secured the stub axles, g, of the carrying wheels, G, the latter being adapted to travel upon the upper faces of the foot flange, e, and on the respective sides of web, $e'$, of channeled beam, E, as shown more particularly in Fig. 5, whereby the carriage is adapted to travel lengthwise of said channeled beam. Side members, f, of the carriage frame support bolts or stub axles, h, and on the stub axles are loosely mounted the sheaves, $b^2$, adapted to receive operating cable, C, the latter acting to support the bucket, skip or sling, C', as in the construction of the cableway illustrated in Fig. 1.

I designates a cam shaft which extends transversely through side plates, $f^3$, of the carriage frame, and is disposed below the track afforded by channeled beam, E. This cam shaft is provided with cams, $i$ and $i', i'$, the cam, i, being intermediate between the two other cams, $i'$, the end portions of said cam shaft, I, being journaled in the carriage frame. The cams of said shaft, I, operate the shoes, J, K, K', of the gripping mechanism simultaneously, the shoe, J, being moved in a downward direction by cam, i, at the same time that shoes, K, K', are moved in an upward direction by cams, $i', i'$, of said shaft, I. Said shoes, K, K', are disposed at the respective sides of the carriage and positioned for engagement with the upper face of foot flange, e, said shoes being provided in their lower faces with wear plates, k, the latter being composed of metal, wood or any other material which will secure good frictional engagement of said shoes with the upper face of the foot flange. The shoes are provided with depending members, $k'$, which are formed with openings adapted to receive cams, $i', i'$, whereby said cams of the shaft, I, will operate on shoes, K, K', to raise or lower them according to the direction in which shaft, I, is turned. The depending members, $k'$, of said shoes, K, K', are provided with slots, $k^2$, and in these slots operate the guide fingers, j, of shoe, J, said shoe being positioned between the side members of the carriage and adapted for engagement with the under-face of foot flange, e, see Fig. 5. Shoe, J, is provided in its upper face with wear plates, $j'$, of wood, metal or other material adapted to secure good frictional contact between the shoe and the foot flange of the channeled beam, and said shoe, J, is provided, furthermore, with a depending member, $j^2$, the latter having an opening for the reception of cam, i, on shaft, I.

It will be noted that shoe, J, is slidably engaged with depending slotted parts of shoes, K, K', so that said shoes are kept in proper coöperative relation by sliding engagement with each other, and by the snug fitting of cams, i, i', with the depending parts of said shoes.

The gripping mechanism thus far described is operated by appropriate mechanism for the purpose of releasing it from firm engagement with the track afforded by the channeled beam whereby the carriage may travel freely in one direction or the other on said track; but the operating mechanism is adapted, also, to so operate the shoes of the gripping mechanism that the carriage will be held in a stationary position on the track.

It is preferred to provide an operating mechanism for the carriage grip which tends normally to release the shoes from engagement with the channeled beam, but when the carriage is to be held at rest or in a locked position in relation to said beam, the gripper releasing devices will be rendered inoperative temporarily, and the shoes, J, K, K', forced into tight frictional engagement with said beam.

L designates a weight adapted by gravity to open the gripper and release the shoes from the beam. Said weight is shown in Fig. 6 as fitted slidably on an arm or lever, $l$, which is keyed or otherwise made fast to one end of cam shaft, I. The weight is provided with a binding screw, $l'$, for holding it at any desired adjustment on arm or lever, $l$, and under certain conditions, said weighted arm turns cam shaft, I, so that its cam, $i$, will depress shoe, J, and cams, $i'$, will raise shoes, K, K', thereby opening the gripper by removing the shoes from frictional contact with the beam, so that the carriage will travel freely on said beam. To the other end of cam shaft, I, is secured an operating lever, M, said lever being fast with the cam shaft and adapted to move the same under the pull or strain of a line or cable, D. The weighted arm, $l$, is preferably disposed at one side of the carriage while the operating arm or lever. M, is at the other side of the carriage, see Fig. 6. The arm or lever, M, is forked at its free end, as at $m$, and provided with a keeper, $m'$, and in this forked end of the lever is a pulley or stub axle, $m^2$, which supports a guide sheave, M', beneath which extends operating line or cable, D. Said cable is guided over sheaves, $n$, $n'$, and beneath a guard, $n^2$, in such manner that a bight or loop, $D^2$, is produced in cable, D, as shown more clearly in Fig. 4. One sheave, $n$, is mounted on an upward extension of an arm, $f^2$, of the carriage frame, the other sheave, $n'$, is supported on an arm, $f^5$, of said carriage frame, and guard, $n^2$, is firmly attached to said arms, $f^2$, $f^5$, see Fig. 4. As in the cableway of Fig. 1, operating line or cable, D, is anchored at one end to a tower or other fixed anchorage, extends to the carriage so as to run over sheaves, $n$, $n'$, and below sheave, M', of operating arm, M, and from said lever the operating line extends to and over the direction pulley, $d'$, as in Fig. 1, so that said line may be attached to an operating device or mechanism, as D'.

From this construction it is apparent that when the operating line or cable, D, is slackened, weighted arm, $l$, will turn cam shaft, I, and said shaft will operate shoes, J, K, K', to open the gripper and free the carriage from engagement with the beam; but when strain is imposed on the operating line or cable by the action of lever, D', or its equivalent, the bight, $D^2$, of said cable will raise arm, M, and turn the rock shaft in a direction which will cause its cam, $i$, to raise shoe, J, while its cams, $i'$, will simultaneously depress shoes, K, K', thereby closing the gripper and forcing its shoes into tight frictional engagement with the track, whereby said carriage will be locked in a fixed position on, and by frictional engagement with, beam, E.

The shoes and wear plates of the gripping mechanism are subjected to considerable wear owing to the sliding engagement of said wear plates with the channeled beam, and in order to preserve the shoes in proper coöperative relation to the beam, and thereby compensate for the wear on the opposing surfaces of the beam and the shoes, I employ means whereby the shoes may be adjusted relatively to said beam by adjusting the cam shaft, I, in its bearings. Said adjusting means is shown in Figs. 4, 5 and 6 in the form of gears, N, N', which are provided with sleeves, $n^3$, said sleeves being fitted on the end portions of shaft, I, exteriorly to cams, $i'$, $i'$. Said sleeves enter the openings of frame, B', and operate as bearings for said cam shaft. Each gear, N, and its sleeve, $n^3$, is provided with an opening eccentric to the axis of the gear, and through the openings of the two gears, N, N', pass the end portions of shaft, I, whereby said gears, N, N', are mounted eccentrically on the end portions of the cam shaft. With each gear, N or N', meshes another gear, O, shown more clearly in Figs. 11 and 12. Said gear, O, is provided with a polygonal extension, $o$, of its hub, and said gear is mounted loosely on the fixed bolt, O', secured in the side plate, $f^3$, of the carriage frame. The bolt extends outwardly from the frame so that the gear, O, and its hub extension, $o$, may be mounted loosely on the bolt, whereby gear, O, is adapted to mesh with eccentric gear, N, and the polygonal extension, $o$, of said gear, O, is exposed for access, thus enabling the operator to apply a wrench or other implement to the extension, $o$, for the purpose of turning the gear, O, and its complemental gear, N or N'. When the intermeshing gears shall have been adjusted in order to position the cam shaft, I, and adjust the shoes of the gripping mechanism to the desired extent, said gears, O, are locked in place by any suitable means, such as by a nut, $o^2$, which is screwed on the threaded outer end of bolt, O', each gear, O, being clamped firmly between the frame, $f^3$, and the nut, $o^2$.

It will be seen that a partial turn of gears, O, will adjust the eccentric gears, N, N', and thus change the position of shaft, I, in carriage frame for the purpose of imparting the necessary slight adjustment to the gripper shoes in order to bring them closer to the faces of the channeled beam, whereby the shoes are adjusted to compensate for wear, after which the shaft adjusting devices are held rigidly in place by the locking nuts, $o^2$, the shaft, I, being free to turn in the sleeves, $n^3$, of the eccentric gears, N, N', when said shaft is rocked by the weighted arm, $l$, or the cable operated arm, M, as will be readily apparent from the foregoing description taken in connection with the drawings.

The operation of the invention as thus far described in connection with Figs. 1, 4, 5 and 6, may be summarized briefly as follows: Assuming that carriage, B, is locked on the track at a point where the bucket, skip or sling is to be loaded, or has been loaded, the first step is to set one drum, $c'$, or $c^4$, into operation for the purpose of elevating the bucket, skip or sling and the load to the desired point with respect to the carriage. The operator now releases the operating device, D', and slackens the operating line, D, whereupon the weighted arm, $l$, turns cam shaft, I, and cam $i$, operates shoe, J, to move it downwardly with respect to the underface of beam, E, and simultaneously with such movement cams, $i'$, $i'$, of said shaft operate shoes, K, K', to raise them, thus simultaneously moving shoe, J, in an opposite direction to shoes, K, K'. The carriage is thus released, and the continued pull on the cable causes the carriage and the load to travel along the track until it reaches the point of discharge, the sheaves, $n$, $n'$, and M', running freely with relation to the slack operating line, D. When the carriage and its load reaches the point of discharge, the operator moves lever, D', to place tension on the operating line, D, and lever, M, is thereby drawn upwardly for the purpose of rocking shaft, I, and operating the shoes of the gripping mechanism, whereby the carriage is again locked in a stationary position on the beam, whereupon cable, C, is slackened and the load is discharged in a well known manner. The other drum is now driven by the engine or motor for the purpose of operating cable, C, and hauling the carriage and the bucket back to the point where said bucket will be reloaded, and these operations are repeated during the continued service of the apparatus.

In Figs. 2, 7 and 8 of the drawings I have illustrated my invention embodied in carriage, $B^2$, adapted for operation on the track cable, $A^2$, of a cableway embodying the general features illustrated in Fig. 1. Said carriage, $B^2$, is of skeleton construction, and as shown, it is provided with the carrying wheels, $b$, $b'$, adapted to travel on the cable, $A^2$. The carriage is provided, also, with sheaves, $b^2$, for accommodating the carriage operating cable, C, and the bucket, skip or sling. The frame of carriage, $B^2$, is provided with depending substantially parallel frame plates, $b^3$, which are secured firmly at their upper ends to the top rails or bars of said carriage, $B^2$. At their lower ends the depending frame plates, $b^3$, are provided with stay plates, $b^4$, and in these stay plates, $b^4$, and the frame plates, $b^3$, are loosely fitted the sleeves, $n^3$, of the eccentric gears, N, N', serving as the bearings for the cam shaft, I. For the ready assemblage of the parts, said cam shaft is shown in Fig. 8 as consisting of complemental sections, I', which are separably locked together by a suitable joint, $i^8$. Said shaft, I, is provided at its middle portion with cam, $i$, adapted to operate the sheave, P, which serves the purpose of the lower shoe, J, in the construction of Figs. 5 and 6, said sheave, P, being loosely mounted on the cam portion, $i$, of said shaft, I, so that the sheave will turn freely on the shaft and be adjusted relative to track cable, $A^2$, by the operation of the shaft, I. As in the construction of Figs. 4, 5 and 6, shaft, I, is turned in one direction by weighted arm, $l$, attached to one end portion of the shaft for the purpose of releasing the shoes from gripping engagement with track cable, $A^2$. To the other end portion of said cam shaft, I, is rigidly secured arm, M, which is provided at its free end with keeper, $m'$, and with sheave, M'. The top rail of carriage, $B^2$, is provided with other sheaves, $n$, $n'$, and with guard, $m^2$, and over these sheaves, $n$, $n'$, pass the operating cable, D, formed into a bight or loop engaging with sheave, M', whereby lever, M, may be raised, and shaft, I, rocked in order to apply the shoes of the gripping mechanism, said shoes in the construction of Figs. 2, 7 and 8 being in the form of a wheel, P, heretofore described, and of other wheels, P', P', now about to be described. The upper sheaves, wheels or shoes, as they may be variously termed, indicated at P', P', are mounted in an auxiliary frame, Q, slidably fitted in carriage frame, $B^2$, said frame, Q, having depending members, $q$, which are engaged at their lower ends with the cams, $i'$, $i'$, of shaft, I. The lower wheel, sheave or shoe, P, is so positioned that its axis is in a vertical plane intermediate the vertical planes of the axes of rotation of the upper wheels or shoes, P', as shown clearly in Fig. 7, whereby lower wheel or shoe, P, engages with the under side of cable $A^2$, whereas upper wheels, P', P', engage with the upper surface of cable, $A^2$, so that the cable will be deflected slightly between the points of engagement of shoes, P, P', P', when pressure is applied to said shoes for the purpose of gripping the cable. The wheels or shoes, P, P', P', are grooved in order to properly engage with the track cable, and when shaft, I, is rocked or turned by the tension of operating line, D, acting on the arm or lever, M, the cam, $i$, raises shoe, P, upwardly and cams, $i'$, $i'$, depress frame, Q, and force the upper shoes, P', P', downwardly, thus making the shoes grip the track cable. It is found, however, that the group of gripping shoes will permit the carriage to have a sliding travel upon the track cable for a limited distance, and in order to produce an efficient mechanism for stopping the carriage, it has been found desirable to employ brake devices which supplement the action of the gripping shoes, particularly when said shoes are in the form of rollers or sheaves mounted for free rotation in the carriage. In the embodiment of the invention shown in Figs. 7 and 8, the braking device is represented as a brake member, R, mounted in sliding frame, Q, intermediate the shafts of upper wheels or shoes, P', P'. The underface of brake member, R, is curved at $r$, see Fig. 8, and this curved face is in a horizontal plane above the curved peripheries of wheels or sheaves, P', P'. Normally the brake member, R, is free from engagement with track cable, $A^2$, as in Figs. 7 and 8, but when cam shaft, I, is operated to raise the lower sheave, P, and depress the upper sheaves, P', P', said track cable is slightly deflected in an upward direction and the brake member, R, is brought forcibly into engagement with said track cable, whereby the brake member supplements the action of the gripping mechanism in arresting the carriage and locking it firmly upon the track cable.

The carriage, $B^3$, illustrated in Fig. 3 of the drawings embodies the general features of my invention, as heretofore described in connection with Figs. 2, 7 and 8, but instead of operating lever, M, directly by the bight or loop, $D^2$, of operating line, D, as in the devices heretofore described and shown in Figs. 1, 2, 4, 5, 6, 7 and 8, I provide toggle mechanism intermediate the bight or loop, $D^2$, and lever, M, whereby an increased throw may be given to said lever and to the cam shaft. As shown, lever, M, is pivoted at its outer end to a link, S, and the otherwise free end of said link is pivoted at $s$ to another link, S', said link, S', being pivoted at $s'$ to a member of the carriage frame, $B^3$. The pivotal pin connecting links, S, S', serves as the shaft for roller, M', beneath which passes the looped portion, $D^2$, of the operating line, D. When the operating line is made taut, by the operator moving lever, D', as heretofore described, the pull of the loop or bight, $D^2$, on sheave or roller, M', will raise the links, S, S', to the dotted line position shown in Fig. 3, the upward and forward movement of link, S, being arrested by a stop, $s^2$, which is fixed to frame plate, $b^3$, of the carriage. The toggle mechanism will operate lever, M, and shaft, I, to secure an increased movement or throw as compared with the devices of Figs. 2, 7 and 8 and Figs. 4, 5 and 6, whereby the cams of shaft, I, will operate the shoes of the gripping mechanism and cause them to engage firmly with the track cable. When the pull on the operating line, D, is slackened, the action of weighted lever, $l$, on cam shaft, I, will return the lever, M, and links, S, S', and sheave, M', to their normal positions, shown in full lines in Fig. 3.

The form of the invention shown in Figs. 9 and 10 embodies the generic features of the construction shown in Figs. 7 and 8, but I have simplified the construction by employing two sheaves, $P^2$, $P^3$, instead of the three sheaves illustrated in Fig. 7. The lower sheave, $P^2$, is mounted directly on cam, $i$, of shaft, I, so that it will engage with the underside of track cable, $A^2$, but the upper sheave, $P^3$, is in a sliding frame, consisting of the side members, $Q^2$, which engage with cams, $i'$, $i'$, of shaft I. The side members of said sliding frame are provided at their upper parts with slots, $q^2$, in which are disposed slidable boxes, $q^3$, supporting the shaft, $p^3$, for upper shoes, $P^3$, said boxes being normally disposed in the slots by springs, $q^4$. Set screws, $q^5$, mounted in the upper ends of frame members, $Q^2$, regulate the tension of springs, $q^4$, so as to force the shoe or sheave, $P^3$, into contact with the upper portion of track cable, $A^2$. Side members, $Q^2$, of the frame are adapted to be reciprocated by cams, $i'$, of shaft, I, and when said members are drawn downwardly, sheave or shoe, $P^3$, engages with the cable at the same time that cam, $i$, presses shoe, $P^2$, also into engagement with the cable, but a continued movement of shaft, I, turns the cams, $i'$, so as to further depress the frame members, $Q^2$, and bring into action certain braking devices subsequent to the engagement of the sheaves or shoes with the cable, $A^2$. The brake surfaces referred to are in the form of segmental flanges, $Q^3$, which are provided on the upper opposing faces of frame plates, $Q^2$, as shown in dotted and full lines in Figs. 9 and 10. The sheave or shoe, $P^3$, is provided with flanges, $Q^4$, extending sidewise therefrom, and these flanges are in the vertical planes of the brake elements, $Q^3$, so that on the downward movement of frame plates, $Q^2$, brake surfaces, $Q^3$, will engage with flanges, $Q^4$, after sheave or shoe, $P^3$, engages with track cable, $A^2$, whereby the rotation of sheave or shoe, $P^3$, will be arrested by the coöperating brake surfaces, $Q^3$, $Q^4$, thereby bringing the carriage to a state of rest and locking said carriage fixedly in position on the track cable.

The construction shown in Fig. 13 of the drawings embodies movable carriage, $B^4$, with the cam shaft, I, the weighted arm, $l$, and the cable operated arm, M, all as hereinbefore set forth; but in lieu of the various forms of gripping mechanism heretofore described, I employ a grip composed of movable jaws, T, T′, pivoted at $t$ on the carriage and operatively engaged with the respective cams of shaft, I. Said jaws extend upwardly on the respective sides of web, $e'$, forming a part of beam, E, and the jaws are provided with shoes, $t'$, having wear plates, $t^2$. The cams of shaft, I, operate jaws, T, T′, so as to forcibly apply the shoes into frictional engagement with the respective faces of web, $e'$, and by associating the gears, N, N′, and O, with cam shaft, I, in the manner hereinbefore described, I produce a simple and efficient gripping mechanism wherein the parts may be adjusted to compensate for wear due to the frictional engagement of wear plates, $t^2$, with the web of the channeled beam.

In Fig. 14 the pivoted jaws, T, T′, are shown as having hooked shaped shoes, $t^3$, adapted for engagement with the respective edges of the foot flange, $e$, of the channeled beam.

Fig. 15 illustrates a gripping mechanism of substantially the form shown in Fig. 13 adapted for use in conjunction with the track cable of a cableway system. Carriage, $B^5$, and cam shaft, I, are similar in construction to the corresponding devices of the various figures shown and described herein. Jaws, $T^2$, $T^3$, are pivoted at $t^3$ on carriage, $B^5$, and are engaged at their opposite ends with the cams of shaft, I. Said jaws are provided with sheaves or shoes, U, U′, mounted in the jaws for engagement with the respective sides of cable, $A^2$, and said sheaves or shoes are provided with brake surfaces, $u$, adapted to be engaged by brake surfaces, $u'$, of the jaws, $T^2$, $T^3$. When the jaws are closed by the action of the cams on shaft, I, roller shoes, U, engage with the cable, and as said roller shoes are yieldably mounted in the jaws, said shoes are adapted to be repressed for the brake surfaces, $u$, to engage with the brake surfaces, $u'$, thus arresting the roller shoes from rotation and providing an efficient brake and gripping mechanism for holding the carriage in a stationary position on the track cable.

It is desirable to provide means for regulating and changing the position of the lever arm, M, with respect to the cam shaft, I, and in Fig. 16 of the drawings there is shown a simple and efficient adjusting means for said lever. On the protruding end portion of shaft, I, is fitted a gear, V, having a sleeve, $v$, said gear and its sleeve being made fast to the shaft by a key, $v'$, or its equivalent. Lever arm, M, is provided at its inner end with an eye or ring, $w$, which is fitted loosely on the sleeve, $v$, so as to lie between the gear, V, and one side member of carriage, B. Secured rigidly to the lever arm, M, is a bolt, W, and on this bolt is an adjusting gear, W′, and screwed on said bolt, W, is a nut, $w'$, adapted to clamp the gear, W′, firmly against the arm, M. The gear, W′, mounted on the arm, M, meshes with the gear, V, which is keyed on shaft, I. When it is desired to change the relation of the cable controlled arm, M, to the cam shaft, I, nut, $w'$, is partly unscrewed from bolt, W, and the arm, M, is then moved to the required position, gear, W′, traveling idly over gear, V. The lever having been adjusted as required, nut, $w'$, is tightened on the bolt and gears, W and V, are thus locked in position so as to retain said arm, M, in the desired relation to cam shaft, I, whereby the arm and cam shaft may be rocked or turned as a unit, being connected rigidly by the locked gears, V, W′.

Having thus fully described the invention, what I claim as new, and desire to secure by Letters Patent is:

1. In an apparatus of the class described, an aerial track, a load-supporting carriage adapted to travel thereon, a power cable for operating the carriage in either direction on the track, gripping mechanism supported by said carriage for coöperation with the track, and a cable for operating said gripping mechanism and at a point distant from the carriage, whereby the carriage may be held stationary relative to the track and at any point of its travel thereon.

2. In an apparatus of the class described, an aerial track, a load-supporting carriage adapted to travel thereon and to support a load extending below the track, gripping mechanism supported by said carriage for coöperation with said track, means associated with said gripping mechanism for normally releasing it from engagement with the track, and cable-operated means for closing the gripping mechanism whereby the carriage may be held in a fixed position on the track.

3. In an apparatus of the class described, an aerial track, a carriage adapted to travel thereon, a power cable for operating the carriage in either direction relative to the track, gripping mechanism supported on the carriage, and means for operating the gripping mechanism at a point distant from the carriage, said gripping mechanism including oppositely movable shoes adapted for engagement with the track and a cam shaft connected with said shoes for operating the same.

4. In an apparatus of the class described, an aerial track, a carriage adapted to travel thereon, a power cable for operating the carriage in either direction on the track, gripping mechanism supported on the carriage for engagement with said track, means for operating said gripping mechanism to release it from the track, and a separate cable adapted for closing the gripping mechanism into frictional engagement with the track.

5. In an apparatus of the class described, an aerial track, a carriage adapted to travel thereon, gripping mechanism supported on the carriage for engagement with said track, means for operating said gripping mechanism to release it from the track, separate means adapted for closing the gripping mechanism into frictional engagement with the track, and a manually controlled operating cable associated with one of said means whereby the gripping mechanism may be controlled at a point distant from said carriage.

6. In an apparatus of the class described, an aerial track, a power operated carriage adapted to travel thereon, gripping shoes supported on the carriage and adapted for engagement with said track, and a single cam shaft coöperating with said shoes for operating the same to apply and release the gripping mechanism.

7. In an apparatus of the class described, an aerial track, a carriage adapted to travel in either direction on said track, gripping shoes supported on the carriage and adapted for engagement with said track, means for operating said gripping shoes, and separate means for adjusting said shoes to compensate for wear.

8. In an apparatus of the class described, an aerial track, a carriage adapted to travel thereon, a power cable for operating the carriage in either direction, gripping shoes supported on the carriage and adapted for engagement with the track, a cam shaft for operating said shoes, a separable cable operatively connected to the cam shaft, and separate means for adjusting said shoes to compensate for wear.

9. In an apparatus of the class described, an aerial track, a carriage adapted to travel thereon, a power cable for operating the carriage in either direction, gripping shoes supported on the carriage and adapted for engagement with said track, a cam shaft for operating said shoes, a separate cable operatively connected with the cam shaft, and means for adjusting the cam shaft to compensate for wear on the gripping shoes.

10. In an apparatus of the class described, a carriage, gripping shoes supported on the carriage and adapted for engagement with a member to be gripped, a cam shaft for operating said shoes, gears coöperating with said cam shaft, said gears being eccentrically positioned with relation to said cam shaft, and means for locking said gears in adjusted positions relative to said cam shaft.

11. In an apparatus of the class described, a carriage, gripping shoes supported on the carriage and adapted for engagement with a member to be gripped, a cam shaft for operating said shoes, gears coöperating with said cam shaft, said gears being eccentrically positioned with relation to said cam shaft, and other gears meshing with the first named gears for adjusting the same and the cam shaft whereby the shoes may be adjusted relative to the track to compensate for wear.

12. In an apparatus of the class described, a carriage, gripping shoes supported on the carriage and adapted for engagement with a member to be gripped, a cam shaft coöperating with said shoes, a weight for operating said shaft, and cable operated means associated with the shaft for operating the latter in opposition to said weight.

13. In an apparatus of the class described, a carriage, gripping shoes supported on the carriage and adapted for engagement with a member to be gripped, a cam shaft coöperating with said shoes, a weight operating normally to release the gripping shoes, and cable operated means coöperating with the cam shaft for closing the shoes into gripping engagement with the track.

14. In an apparatus of the class described, a carriage, a plurality of gripping shoes adapted for engagement with a member to be gripped, means for operating said shoes, and brake mechanism operating to supplement the gripping action of the shoes in arresting the carriage.

15. In an apparatus of the class described, a carriage, a plurality of gripping shoes adapted for engagement with a member to be gripped, means for operating said shoes, and brake mechanism operated subsequent to the gripping engagement of the shoes with a track and supplementing the action of the gripping mechanism in arresting the carriage.

16. In an apparatus of the class described, a carriage, a plurality of gripping shoes adapted for engagement with a member to be gripped, means for operating said shoes, and brake mechanism operated by the shoe-operating means and adapted for operation conjointly with said shoes in arresting the travel of the carriage.

17. In an apparatus of the class described, a carriage, a plurality of roller gripping shoes, means for operating said shoes, and brake mechanism coöperating with a shoe for arresting the rotary motion thereof and coöperating with the shoes in arresting and locking the carriage.

18. In an apparatus of the class described, a carriage, a group of roller shoes adapted for engagement with a member to be gripped, means for operating the shoes, and a brake member operating conjointly with the shoes in arresting the travel of the carriage.

19. In an apparatus of the class described, a carriage, a group of shoes positioned for engagement with the respective sides of a member to be gripped, means for operating the shoes, and brake mechanism actuated by the shoe-operating means.

20. In an apparatus of the class described, a carriage, a group of shoes positioned for engagement with the respective sides of a member to be gripped, means for operating the shoes, and a brake member intermediate certain of the shoes and acting conjointly therewith in controlling the carriage.

21. In an apparatus of the class described, a track, a carriage, gripping mechanism supported on the carriage, means for operating said gripping mechanism, a lever coöperating with said means, and an adjusting device for regulating the position of said lever relative to its axis of motion.

22. In an apparatus of the class described, a track, a carriage, gripping mechanism supported on the carriage, a shaft coöperating with the gripping mechanism, a lever for operating the shaft, and an adjusting device for shifting the lever relative to said shaft, said adjusting device operating to retain the lever in its adjusted relation to the shaft.

23. In an apparatus of the class described, a carriage, gripping mechanism on said carriage, a lever for operating the gripping mechanism, and toggle mechanism for actuating and varying the throw of said lever whereby the wear on the gripping mechanism is compensated.

24. In an apparatus of the class described, an aerial track, a carriage adapted to be reciprocated thereon, a power cable for reciprocating said carriage, gripping mechanism mounted on the carriage and adapted to lock said carriage to the track, and a separate cable for actuating said gripping mechanism.

25. In an apparatus of the class described, an aerial track, a carriage adapted to be reciprocated thereon, power operated mechanism for reciprocating said carriage, gripping mechanism for locking the carriage to the track, and means whereby said gripping mechanism may be operated at a distant point from the carriage.

26. In an apparatus of the class described, an aerial track, a carriage adapted to be reciprocated thereon, a power cable for reciprocating said carriage, gripping mechanism mounted on the carriage and adapted to lock said carriage to the track, a separate cable anchored at or near the limit of travel of the carriage in one direction, and means for placing tension on said separate cable, said separate cable being associated with the gripping mechanism for operating the latter, said carriage being movable relative to the separate cable.

In testimony whereof I have signed my name to this specification in the presence of two subscribing witnesses.

CHARLES A. MORRIS.

Witnesses:
H. I. BERNHARD,
JAS. H. GRIFFIN.